(12) United States Patent
Straub et al.

(10) Patent No.: US 11,733,978 B2
(45) Date of Patent: *Aug. 22, 2023

(54) AI FACILITATED COLLECTION OF DATA

(71) Applicant: Oracle International Corporation, Redwood Shores, CA (US)

(72) Inventors: Christian Straub, Palo Alto, CA (US); Jeff Price, Medina, WA (US); Walid Abu-Hadba, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,103

(22) Filed: Dec. 17, 2021

(65) Prior Publication Data

US 2022/0107789 A1    Apr. 7, 2022

Related U.S. Application Data

(63) Continuation of application No. 17/031,731, filed on Sep. 24, 2020, now Pat. No. 11,231,915, which is a continuation of application No. 16/213,279, filed on Dec. 7, 2018, now Pat. No. 10,817,270.

(60) Provisional application No. 62/713,929, filed on Aug. 2, 2018.

(51) Int. Cl.
| | |
|---|---|
| G06F 8/35 | (2018.01) |
| G06F 9/451 | (2018.01) |
| G06Q 30/016 | (2023.01) |
| G06F 8/20 | (2018.01) |
| G06N 20/00 | (2019.01) |
| G06F 16/21 | (2019.01) |

(52) U.S. Cl.
CPC .............. *G06F 8/35* (2013.01); *G06F 8/20* (2013.01); *G06F 9/451* (2018.02); *G06F 16/212* (2019.01); *G06N 20/00* (2019.01); *G06Q 30/016* (2013.01)

(58) Field of Classification Search
CPC . G06F 8/35; G06F 9/451; G06F 20/00; G06F 16/212; G06F 8/20; G06Q 30/016
USPC ............................................. 717/104
See application file for complete search history.

(56) References Cited

U.S. PATENT DOCUMENTS

| | | |
|---|---|---|
| 1,042,441 A1 | 10/2012 | Irad |
| 8,849,730 B2 | 9/2014 | Winn et al. |
| 8,990,143 B2 | 3/2015 | Hohndel et al. |

(Continued)

*Primary Examiner* — John Q Chavis
(74) *Attorney, Agent, or Firm* — Trellis IP Law Group, PC

(57) ABSTRACT

An example system and method facilitate automatically generating a software application (e.g., a micro app) to facilitate performing a task, such as collecting information. In one embodiment, the method includes recording plural incidents filed by customers seeking assistance; detecting the filing of a new incident by a customer; using an Artificial Intelligence algorithm to process the incident, based on the plural incidents, to automatically determine additional information, and to determine one or more User Interface (UI) features for facilitating retrieving the additional information from the customer; generating a description of a UI that incorporates the one or more UI features; producing a mechanism (e.g., micro app) for providing access to the one or more UI features to the customer; receiving information from the customer, as entered via the one or more UI features; and storing the information in a database, such that the information is accessible to one or more software applications of the service technician.

20 Claims, 10 Drawing Sheets

(56) References Cited

U.S. PATENT DOCUMENTS

| | | |
|---|---|---|
| 10,817,270 B2 * | 10/2020 | Straub .................... G06N 20/00 |
| 2015/0095473 A1 | 4/2015 | Goetsch |
| 2016/0188302 A1 | 6/2016 | Fredrick et al. |
| 2017/0091617 A1 | 3/2017 | Baughman et al. |
| 2018/0046649 A1 | 2/2018 | Dal Mutto |
| 2018/0067761 A1 | 3/2018 | Cattermole |
| 2018/0121417 A1 | 5/2018 | Misra et al. |

* cited by examiner

Incident Report UI ~20

(or text message UI, etc. after additional information requested by the technician or automatically requested via AI engine)

Describe Problem: ~22

Part type: Washing machine.
Part xyz doesn't work.
When turned on, it makes a loud noise...

Please provide the part number and a photo using the link below: ~58

*Please provide additional info using this link.*

FIG. 3a

Micro App UI ~60
(may be one-use webpage)

Part model #:

*Enter part model # here...* ~62

Click to add photo from phone camera:

[ Take Picture ] ~64

Click to add an existing photo:

[ Browse and Upload ] ~66

[ Submit ] ~68

FIG. 3b

AI FACILITATED COLLECTION OF DATA

CROSS REFERENCES TO RELATED APPLICATIONS

This application is a continuation of U.S. patent application Ser. No. 17/031,731 entitled AI-GENERATED INSTANT MICRO APPS, filed on Sep. 24, 2020 which is a continuation of U.S. patent application Ser. No. 16/213,279 entitled AI-GENERATED INSTANT MICRO APPS, filed on Dec. 7, 2018 which claims the benefit of U.S. Provisional Patent Application Ser. No. 62/713,929, entitled AI-GENERATED INSTANT MICRO APPS, filed on Aug. 2, 2018, which are all hereby incorporated by reference as if set forth in full in this application for all purposes.

BACKGROUND

Present application relates to software and more specifically to accompanying systems and methods for facilitating information collection and sharing.

Systems and methods for facilitating information collection and sharing are employed in various demanding applications and scenarios, including scenarios involving lenders collecting information from lendees in preparation for completing loan applications; software developers collecting information from potential users so as to adjust developed software accordingly; field technicians responding to service requests pertaining to malfunctioning products, and so on. Such applications often demand efficient and user friendly mechanisms for facilitating collecting information from one source or party, and delivering the information to another source or party.

In an example scenario, developers tasked with developing software applications to meet specific customer needs, e.g., information-gathering needs, may attempt to anticipate the customer needs and to encode corresponding software features to facilitate addressing those needs, e.g., information-gathering needs.

However, this approach often leads to cumbersome software applications with complicated User Interfaces (UIs) that are configured to collect information that developers anticipate or guess that the user may wish to eventually obtain using the software. Accordingly, the resulting developed software applications may be undesirably complex and may include unnecessary functionality that the user does not actually need.

SUMMARY

An example method facilitates automatic generation and delivery of ad hoc User Interfaces (UIs) and accompanying micro apps to perform context-specific tasks, such as collecting information from a customer for use by a technician addressing a customer complaint or reported incident. The micro apps can be selectively constructed based in part on context information, such as incident number, data stored in association with the incident number, etc., and based on additional information, such as natural language input describing the task to be performed (e.g., describing the information to be collected using the micro app), and/or inferences generated by an Artificial Intelligence (AI) algorithm that has been trained to infer what UI features should be included in the micro app based on a historical usage record of participants and what micro apps have been previously constructed in similar contextual scenarios.

One example method includes receiving a problem statement from a first person, (e.g., a customer of an enterprise) comprising a description of an incident; recording the description of the incident in a database; issuing a message to a second person (e.g., a technician) tasked with addressing the incident; receiving a request by the second person for additional information about the incident from the first person; using the request, the description of the incident, and context information derived therefrom and stored in the database, to automatically generate metadata describing a first User Interface (UI) with one or more UI controls for retrieving the additional information; automatically constructing a micro app in accordance with the metadata, the micro app including one or more UI display screens constructed in accordance with the metadata; delivering the micro app (or link thereto) to the first person; receiving the additional information from the first person via data entered via the micro app; and making the additional information available to the second person from the database via a second UI.

Another example method for automatically generating a software application to facilitate performing a task includes recording plural incidents filed by one or more first persons (e.g., customer(s)) seeking assistance in solving a problem; detecting the filing of an incident by a first person of the one or more first persons; using an AI algorithm to process the incident, based (at least in part) on the plural incidents, to automatically determine additional information and one or more UI features to facilitate retrieving the additional information from the first person on behalf of a second person; generating a description of a UI that includes the one or more UI features; using a mechanism (e.g., micro app and distribution/delivery mechanism) to facilitate providing the one or more UI features to the first person; receiving information from the first person, as entered via the one or more UI features; and storing the information in a database, such that the information is accessible to one or more software applications of the second person.

Accordingly, various embodiments discussed herein enable on-the-fly generation of micro apps (i.e. that do not require preprogramming) based on a contextual system of record and human understandable input (e.g., natural language input, such as voice or text input). Micro apps that have been previously generated can inform a predictive AI algorithm to facilitate future automatic generation of micro apps, without the need for additional human input.

Such embodiments can reduce the need for developers to anticipate every use case scenario with a custom built app (thereby saving development time, and enabling accommodation of unique use cases without the product vendor needing to anticipate or think about them). As the generated micro apps and accompanying UIs can be automatically tailored to specific use cases, micro app designers can now focus on creating UIs that are optimized for a specific use case, a specific application workflow, a specific set of devices, and a mobile environment that the app will most likely be accessed from.

In general, embodiments can greatly simplify or even eliminate the end-user tasks associated with requesting data (and or other specific tasks), the data of which may be automatically requested (e.g., from a customer) on behalf of the end user (e.g., technician). Embodiments may reduce the time required for field service customer data collection, customer order completion/validation, construction of surveys delivered to users, and so on.

A further understanding of the nature and the advantages of particular embodiments disclosed herein may be realized by reference of the remaining portions of the specification and the attached drawings.

BRIEF DESCRIPTION OF THE DRAWINGS

FIG. 3a illustrates an example incident report UI display screen, which has been augmented with a link to a micro app UI display screen, which has been generated by the system of FIGS. 1-2 to retrieve additional information from a customer on behalf of a technician.

FIG. 3b illustrates an example micro app UI display screen, which can be accessed via the link provided in the incident report UI display screen of FIG. 3a.

DETAILED DESCRIPTION OF EMBODIMENTS

Figure 1:
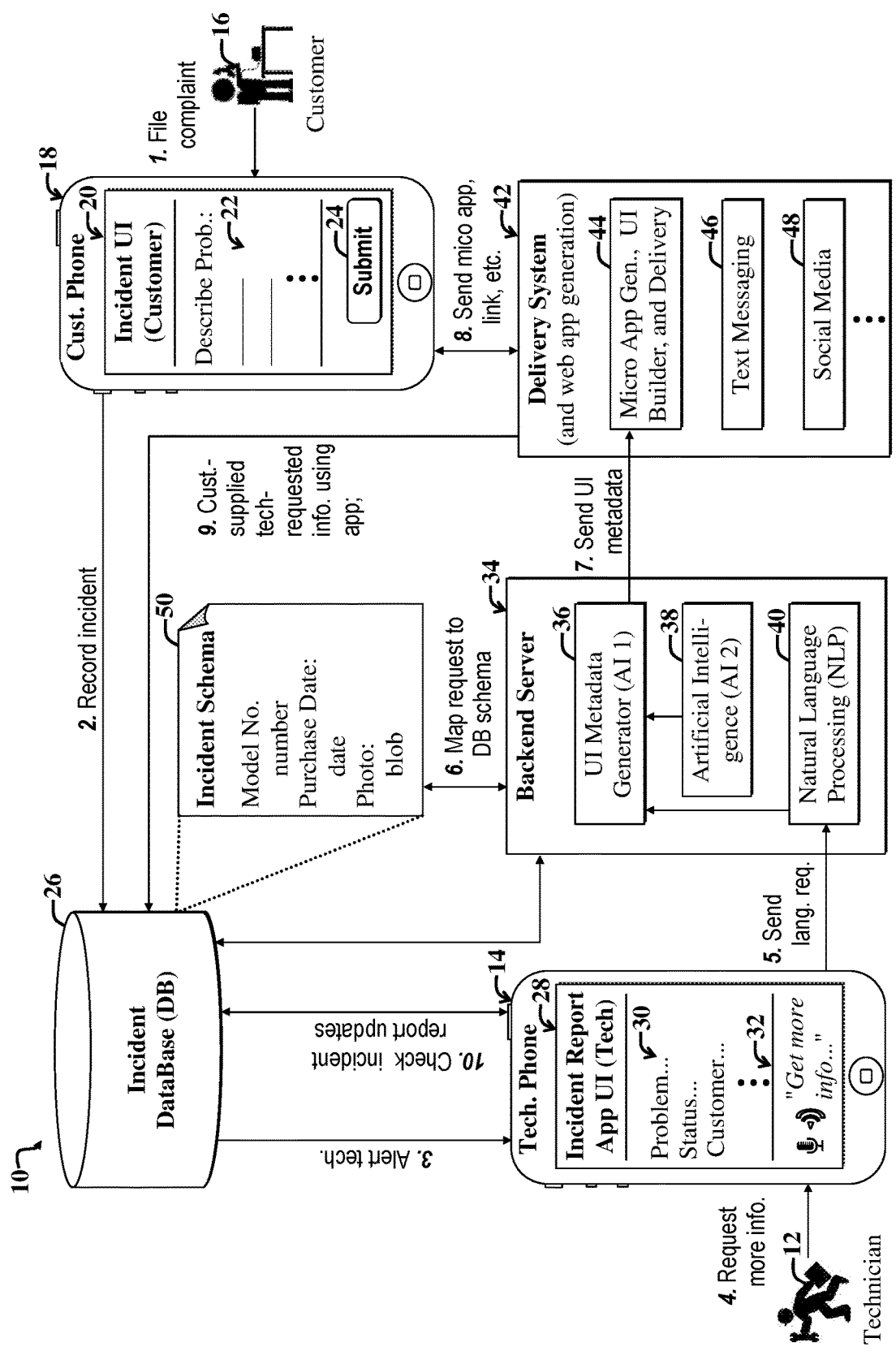
FIG. 1 is a hybrid block diagram and message flow illustrating a first example system and accompanying scenario involving automatic generation of a micro app to assist a technician in obtaining additional information from a customer, as needed by the technician to fulfill a customer request or adequately respond to a customer complaint.

In addition to the descriptions herein, further details and embodiments are found in a 3-page document entitled "Micro-Apps On-Demand," filed with this application.

The above-referenced document illustrates example interactions between mobile devices of a customer and technician with a cloud used to implement an example embodiment.

For the purposes of the present discussion, a computing environment may be any collection of computing resources used to perform one or more tasks involving computer processing. A computer may be any processor in communication with a memory. Generally, computing resource may be any component, mechanism, or capability or quantities thereof of a computing environment, including, but not limited to, processors, memories, software applications, user input devices, and output devices, servers, processes, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For clarity, certain well-known components, such as hard drives, processors, operating systems, power supplies, Internet Service Providers (ISPs), Application Programming Interfaces (APIs), web services, websites, and so on, are not necessarily explicitly called out in the figures.

FIG. 1 is a hybrid block diagram and message flow illustrating a first example system 10 and accompanying scenario (represented by steps 1-9) involving automatic generation of a micro app (e.g., as may be accessible via an incident UI 20) to assist a technician 12 in obtaining additional information from a customer 16, as needed by the technician 12 to fulfill a customer request or to adequately respond to a customer complaint or service order.

For the purposes of the present discussion, a micro app may be any software application specialized to perform a specific or specialized software action. A software action may be any process or collection of processes or operations implemented via software. Additional examples of processes include retrieving data from a customer, updating or editing data in a database, placing a product order, creating an opportunity business object, creating a business contact object, adding a revenue line to a business object, launching an enterprise software application, displaying a dialog box, and so on. Various micro apps discussed herein may be built using HyperText Markup Language (HTML) and may readily integrated in a mobile UI or otherwise accessible from a browser that can access a website hosting the micro app.

The example system 10 includes a first mobile device (e.g., technician phone) 14 and accompanying incident report application UI 28 in communication with a backend server 34 and incident database 26. A customer phone 18 communicates with the incident database 26 and a micro app and message delivery system 42. The delivery system 42 communicates with the backend server 34 and the incident database 26.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, in certain implementations, the delivery system 42 may be hosted on the backend server 34, which may represent an application server.

Furthermore, while the technician phone 14 and customer phone 18 are shown communicating directly with the incident database 26, that communications with the incident database 26 may actually be routed through the backend server 34 and may be accessible via one or more web services and/or APIs running on the backend server 34. Furthermore, in certain embodiments, the backend server 34 is accessible to the mobile devices 14, 18 via a website that is hosted on a web server, wherein the website includes functionality for communicating with software applications of the backend server 34, wherein the software applications then enable web site access to data of the incident database 26.

The customer phone 18 includes an incident UI display screen 20 with one or more UI controls (e.g., fields, menus, buttons, etc.) for entering a problem description 22 and for submitting an associated incident report (e.g., using a submit button 24). The problem description may include, for example, a part number, type, date of incident, nature of the incident or problem, any error codes, and so on. The problem description (also called incident description or complaint data) may represent a type of context information usable to facilitate automatic generation of micro apps, as discussed more fully below.

The technician phone 14 runs a technician incident report application represented by an incident report UI display screen 28. Information describing a particular incident submitted by the customer 16 can be retrieved from the incident database 26 in which the corresponding incident report has been filed. The retrieved information can then displayed as incident description data 30 in the technician incident report UI display screen 28. The UI display screen 28 further includes one or more UI controls 32 for enabling natural language input.

For the purposes of the present discussion, natural language may be any speech or representation of speech, i.e., spoken or written language. Similarly, natural language input may be any question or statement, e.g., instruction, request, or other information provided via spoken or written human language to a computer. Examples of language input usable with certain embodiments discussed herein include voice commands, text messages (e.g., Short Message Service (SMS) text messages), and emails containing text, direct text entry, and so on. The terms "natural language input" and "language input" may be employed interchangeably herein.

The backend server 34 includes a Natural Language Processor (NLP) 40 that includes code for processing and interpreting natural language input provided via the technician incident report UI display screen 28. Resulting processed natural language can be converted into one or more software commands (e.g., a command to "get a photo") that may be input to a first AI module 36, which is also called the UI metadata generator herein. The UI metadata generator 36 includes code for generating a description of a UI to be generated for a micro app that is to be delivered to or otherwise made available to the customer 16 via the customer phone 18. For the purposes of the present discussion, metadata may be descriptive information characterizing something, e.g., a UI or other data.

In the present example embodiment, the first AI module 36, i.e., UI metadata generator, runs an AI algorithm that is configured to respond to natural language input (e.g., commands or requests from the technician phone 14 that have been processed by the NLP 40) by mapping the commands or requests to an incident schema 50 of the incident database 26 to facilitate learning or otherwise determining what fields, UI controls, and/or other features should be described by UI metadata to be output by the UI metadata generator 36 responsive to the received commands or requests from the technician 12 via the technician phone 14.

The incident schema 50 may include or specify an example format for a particular incident of a particular type that matches the filed incident report. The formatting allows the first AI module 36 to infer a formatting for one or more fields of the micro app to be generated. The formatting information can facilitate generation of a description of the UI to be generated, e.g., via a micro app generator 44 of the delivery system 42, as discussed more fully below. Note that while in the present example embodiment, the micro app generator 44 is shown as part of the delivery system 42, that in other implementations, the micro app generation may occur on the backend server 34 along with the UI metadata generator 36, which may automatically output the UI metadata in the form of a micro app implemented in HTML.

A second AI module 38 (also called the predictive AI module) runs an algorithm to automatically infer, i.e., predict, what additional information the technician 12 may need to service a particular customer incident report (e.g., filed complaint) that has been filed in the incident database 26. Note that the filing of an incident report by the customer 16 with the incident database 26 may represent an event trigger that initiates use of the second AI module 38.

The second AI module 38 may collect context information (e.g., incident number, incident description, related incidents in the historical record maintained by the incident database 26, related incident descriptions, associated technician identification information, other technicians of similar classifications, and so on) pertaining to a given event trigger (e.g., the filing of an incident report) from the incident database 26. The context information is then usable by the second AI module 38 to automatically infer and anticipate what additional information (given the filed incident report) that the technician 12 may like to request.

Note that the AI algorithms for the AI modules 36, 38 may be implemented via neural networks, e.g., recurrent neural networks employing multiple hidden layers of Long Short-Term Memory (LSTM) cells. The LSTM cells are usable to avoid the vanishing gradient problem during neural network training and back propagation of error signals used to adjust neural network hidden layer weights. The neural networks of the AI modules 36, 38 may be trained via supervised learning and/or unsupervised learning. In general, embodiments may implement AI algorithms and associated neural networks, adapted to meet the needs of a given implementation.

The delivery system 42 includes the micro app generator 44, which includes code for generating a micro app based on a description of one or more features of the micro app to be generated, wherein the description (comprising UI metadata) is output from the UI metadata generator 36 of the backend server 34. The constructed micro app (or means for accessing the micro app, e.g., a hyperlink) may be delivered to the customer phone 18 and associated incident UI 20 via a text messaging system 46, a social media messaging system 48, and/or other mechanism (e.g., email).

An example scenario is illustrated via steps labeled 1-9 in FIG. 1.

1) The customer 16 enters a description of a complaint or incident using a generic UI, e.g., as represented by the incident UI display screen 20.

2) This incident and accompanying problem description 22 is filed or recorded in the incident database 26 along with cursory information (e.g., customer name, etc.) provided by the customer 16.

3) An alert is then sent to the technician phone 14. The alert may be a message that is pushed to a mobile application (represented by the incident report application UI display screen 28) of the technician phone 14. Content 30 of the alert includes the information from the incident report, including information contained in the filed problem description 22, and any other applicable information that the customer has provided.

4) If the technician 12 needs additional information, the technician 12 can employ voice-entry UI control 32 to speak or type a request for additional information. For example, the technician 12 may state "I need the model number and a photo of the part."

5) The natural language, in combination with incident information 30 from the alert is then sent to the backend server 34, which includes the natural language processor 40. The natural language processor 40 then processes the natural language portion of the input to determine what is specifically being requested by the received natural language.

6) The request is then mapped to the schema 50 of the incident database 26 via the first AI module 36 (i.e., UI metadata generator). The "model number" and "photo" are, for example, mapped to the equivalent columns in the database. From this schema 26, the AI module 36 will know the type of (and descriptive characteristics of) each of field, e.g., the model number is a number, and photo represents a binary storage or blob.

7) The descriptive information (e.g., field types, characteristics, etc.) derived from the schema 50 associated with the incident is then usable by the UI metadata generator 36 (and/or by the micro app generator 44) to convert the descriptive information (e.g., information about the types of the fields) into a preferred format for capturing the requested input (requested by the technician 12) from the customer 16.

8) The resulting UI metadata output from the UI metadata generator 36 is then passed to the delivery system 42. The micro app generator 44 thereof then builds the described UI and associated micro app, depending on whatever the customer 16 can accept (e.g., via the customer phone 18). For example, the delivery system 42 could send a text message with a link to a web application that implements the micro app. That web application may have a UI that has an input field for the model number, and a button that will capture a photo that the user can take of the part, so as to facilitate fulfilling the information requested by the technician 12

9) The customer 16 then uses that micro app to fill out and provide the requested information, which then updates the database 26 with the additional information.

10) The technician 12 can later employ the incident report application UI display screen(s) 28 view the updates on the incident report as needed.

Note that at no point do the technician 12 and customer 16 have to directly interact. And, the technician 12 does not have to wait for the customer 16 to become available, since the process implemented via the example system 10 is asynchronous (i.e. the technician 14 can act when they want, and the customer 16 can respond when they want).

Note that generally, in many scenarios, applications cannot be (or are very difficult to be) pre-constructed, i.e., built ahead of time. A developer cannot always anticipate the needs of a particular contextual scenario. The present example system 10 facilitates implementing a method, whereby a non-programmer can readily specify the needs and purpose of an application, and have an AI algorithm (that understands the system of record and can communicate with the incident database 26) generate the UI needed for that application (which can be for one time use).

Furthermore, note that the system 10 also accommodates a method involving anticipation of requests issued by the technician 12 for a particular contextual setting (e.g., incident type, problem description, etc.), where the second AI module 38 can begin generating the micro apps without input from a user (e.g., without input from the technician 12), given the same starting contextual inputs and triggers.

Note that generally, in absence of implementation of embodiments discussed herein, software applications are prebuilt and launched or referenced with very specific parameters that are used in influencing the UIs of the applications. For example, a bank account page would require the user identity and an account number (mapped to that identity) in order to render that page.

Some use case scenarios can be difficult to predetermine. For example, a field technician may accept requests from customers for broken products. Often, the request may be missing critical information. The field technician would then need to call the customer for more information.

In various embodiments discussed more fully below, a technician can send an instant micro app and accompanying UI to the customer 16, allowing the customer 16 to supply details and to make those details (e.g., photos, etc.) readily available to the technician 12.

Note that without use of embodiments discussed herein, a priori manual development of software applications to support the technician-customer use case scenario described above can be problematic. For example, developers may have difficulty accounting for possible inputs (which may be exceedingly large). This may lead to exceedingly large and complex applications with prohibitively cumbersome interfaces.

Note that various embodiments discussed herein provide various benefits, including enabling efficient on-the-fly software application generation (that does not have to be pre-programmed) based on a contextual system of record and human understandable input (e.g., voice input). Embodiments can also learn what applications have been previously generated based on the context information and natural language input, and can begin to automatically generate software applications (e.g., micro apps) without the need for human input (e.g., natural language input provided by the technician 12 of FIG. 1).

Accordingly, use of the present example system 10 and accompanying methods can reduce the need for developers to anticipate every scenario with a custom built application (thereby saving development time, and allowing unique use cases to be accommodated without the product vendor needing to think about them). End users may save significant time, e.g., by simplifying data requests and/or by eliminating the need for data requests (as data can be automatically requested in their behalf).

In summary, in the example technician-customer use case scenario, an application developer delivering the field technician application (as represented by the incident report application UI display screen 28) can provide a UI widget that launches a voice dictation system (e.g., with UI controls 32 for enabling natural language input). The technician 12 can then speak human text (e.g., "I need the model number and a photo.") and the system 10 can then asynchronously query the customer 16 (via the customer phone 18 and delivered micro app) for that information, and then send it back to the technician 12 (to be viewable via the technician phone 14) later. After performing this function across many technicians, the system 10 includes functionality (e.g., the predictive AI module 38) for then adapting and predicting what the most likely technician request would be given the initial set of input.

In this predictive case, when the customer 16 files a new service request (e.g., complaint, incident report, etc.), the system 10 can automatically generate the micro app requesting the predicted info, and then send that to the customer 16 via the customer phone 18. The technician 12 can then be informed as to the data that was retrieved from the customer 16 and stored in the incident database 26. The technician 12 need not repeatedly attempt to call, email, or text the customer 16 to obtain the additional information (e.g., photos, additional part information, etc.).

The incident database 26 maintains a record (i.e. a set of objects to work on) and contextual information (i.e. current user state), and can issue stimuli (e.g., notifications that an object was created). The second AI module 38 can use such information, in addition to user-provided input (e.g., natural language input provided by the technician 12) describing additional data to be supplied by the customer 16 to the incident database to facilitate training of the second AI module 38.

Output from the AI module 38 can be used by the UI metadata generator 36 to describe the outlines of an application UI (e.g., a UI of a micro app to be delivered to the customer phone 18). This UI description (i.e., UI metadata) can be fed to any appropriate UI generator to produce the actual application UI for implementing a micro app.

When training the AI module 38, generally speaking, the stimuli can be the initiation of the actual event (e.g., receipt of natural language request from the technician 12, during model training) and/or a forced event (i.e. requiring explicit user input). Once trained, the AI module 38 may predict the technician input (i.e., predict or estimate the natural language input that would likely be provided by the technician 12) in view of associated context from the incident database 26. The AI module 38 may be activated and run in response to the filing of an incident report in the incident database 26.

An AI algorithm of the AI module 38 that predicts the natural language request provided by the technician 12 can feed into a another AI module (i.e., the first AI module 36) that handles natural language requests from the technician 12 (e.g., by referencing the incident schema 50 to develop instructions usable by the UI metadata generator 36 to generate a description of an application UI to be used with a micro app to be generated and delivered to the customer 16).

The AI module 38 that predicts the technician input can be wired to an actual event trigger (e.g., the filing of an incident report by the customer 16), so as to facilitate initiation of the automatic generation of the requisite UI and micro app (to request the information from the customer 16 without the technician explicitly needing to request it), as if the technician had explicitly started the process.

In certain embodiments, the UI metadata generator 36 (first AI module) can convert raw UI metadata (e.g., obtained from the AI module 38, in part, via its analysis of the incident schema 50) into a usable format. Alternatively, or in addition, this is performed by the micro app generator 44 of the delivery system 42. For example, in one implementation, the micro app generator 44 can convert raw metadata into HTML. For example:

Input Text (number)→
<input type="number" id="foo"/>

Note that in the present example embodiment, the first AI module 36 generates raw UI metadata, which is then formatted by the micro app generator 44 for use in a constructed micro app. The second AI module 38 can learn over time to automate the additional questions (posed to customers) that would otherwise likely be asked by the technicians.

Figure 2:
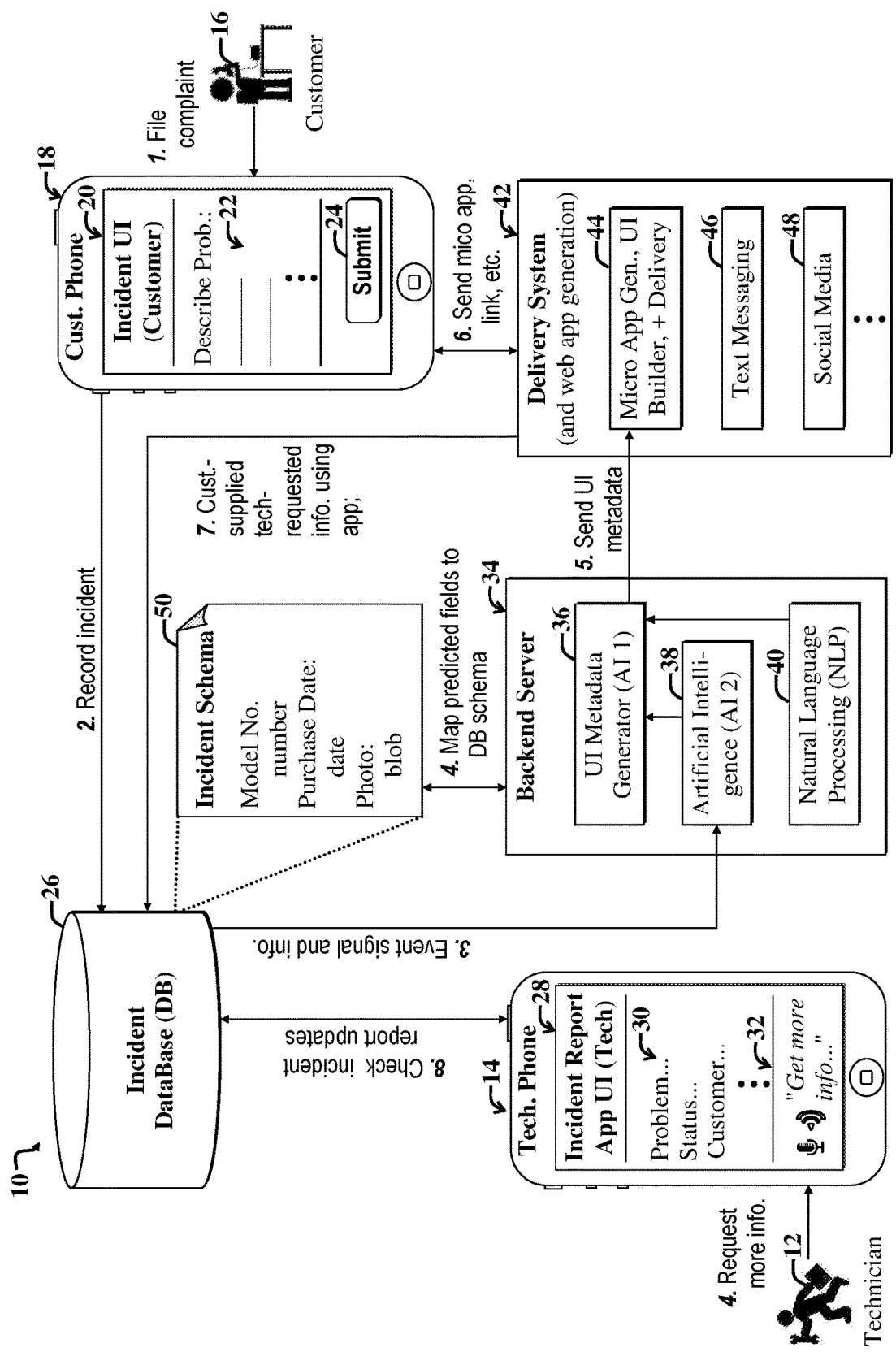
FIG. 2 is a second hybrid block diagram and message flow illustrating the example system of FIG. 1 in an automatic mode, whereby Artificial Intelligence (AI) is used to predict additional information that a technician may need to respond to a given customer request, and to automatically generate and deliver a micro app to the customer to obtain the information therefrom, and subsequently make the retrieved information available to the technician handling the customer request.

FIG. 2 is a second hybrid block diagram and message flow illustrating the example embodiment of FIG. 1 in an automatic mode (also called predictive mode), whereby the second AI module 38 predicts additional information that the technician 12 may need to respond to a given customer request, and to automatically generate and deliver a micro app to the customer 16 to obtain the information therefrom, and then to subsequently make the retrieved information available to the technician 12 handling the customer request.

The present example scenario includes:

1) The customer 16 files the initial incident report.

2) The incident report and associated information is stored in the incident database 26.

3) The storing of the incident report in the incident data triggers an event detected by the backend server 34, which then employs the predictive AI module 38 (which may be based on deep learning neural network) to predict the additional fields needed to accommodate additional data to be obtained from the customer 16.

4) These additional fields are then mapped to the incident schema 50, and the first AI module 36 then generates a description of the UI to be generated.

5) The description of the UI (e.g., UI metadata) is delivered to the delivery system 42 for subsequent micro app generation and delivery thereof to the customer phone 18. The micro app may appear (for instance) as a link that appears in incident UI display screen 20, where selection of the link provides access to a UI of the micro app with fields and/or other UI controls for providing the requested data. For example, a field may appear for enabling entry of a part number, and another control may provide for uploading a photo of the part from a camera of the customer phone 18.

6) The customer 16 then fills out the fields, which then triggers updating of the incident database 26 with the additional information provided via the fields by the customer 16.

7) The technician 12 is then alerted to the incident filed by the customer 16 vie the customer phone 18 and accompanying incident UI display screen 20.

Now, the technician 12 not only has the content from the initially filed incident report, but also has data supplied via the additional fields that the backend server 34 and accompanying predictive AI module 38 has inferred that the technician 14 may need to successfully address the incident. The option for the technician 12 to issue requests (e.g., via natural language input) remains. When the technician 12 makes an additional request, this additional request is usable to further train the predictive AI module 38.

In summary, the system 10 system includes functionality for then adapting and predicting what the most requested information is given the initial set of input pertaining to a given incident. When a customer files a new service request, the system 10 can automatically generate the micro app requesting the predicted information, and then send that micro app to the customer 16; then inform the technician 12 as to what was requested. If what was requested was not accurate or not needed, the technician 12 can issue additional requests and/or may otherwise notify the predictive AI module 38 as to what information was not needed.

Accordingly, the predictive AI module 38 can learn, e.g., including from parameters of previously generated micro apps, and then anticipate and facilitate fulfilling needs of the technician 12 by triggering generation of a micro app to collect information (from the customer 16) to fulfill the anticipated information needs. Hence, over time, the predictive AI module 38 can save the technician time 12 by automatically determining and obtaining additional information that may be needed by the technician 12 from the customer 16, so as to service the incident of the incident report. The predictive AI module 38 works with the UI metadata generator 36 (which may also be implemented as another AI module) to facilitate generating UI metadata needed for construction of an associated micro app.

Accordingly, systems for implementing various methods discussed herein may include functionality for monitoring frequently requested information in different contextual scenarios, and then predicting what will be requested in a particular instance (e.g., a particular type of incident being reported by a customer), given an initial set of inputs for that particular instance. For example, when the customer 16 files a new service request, the system 10 can automatically generate a micro app for facilitating requesting the predicted requested information, and then automatically send the micro app and/or link (or other access mechanism) to the customer 16. The technician 12 can then be informed what information was requested. The technician 12 may optionally request additional information, in which case, another micro app can be generated and delivered to the customer 12 in accordance with the request (and automatically generated responsive to the request).

The UI metadata generator 36 may selectively generate UI metadata based on context, customer and technician input, and neural network inferences (provided by the predictive AI module 38) to facilitate automatic micro app construction. The predictive AI module 38 can learn over time to automate responses to additional requests, questions, and so on.

For example, the predictive AI module 38 may collect a first set of input (e.g., information from a filed complaint or incident report), historically requested information (e.g., information requested by technicians responding to similar incidents), and use that collected information to facilitate predicting or estimating what additional information the technician 12 may request when handling the associated incident of the incident report filed by the customer 16. This prediction or estimation can be fed into the UI metadata generator 36 to generate UI metadata (e.g., the UI metadata generator) that is then used to construct and deliver (e.g., via the micro app generator 44) a micro app (e.g., to a customer) to facilitate collecting (from the customer 16) the predicted requested information (predicted to be requested by the technician 12 in absence of automatic inference by the AI algorithm.

FIG. 3*a* illustrates an example incident report UI display screen 20, which has been augmented with a link 58 to a micro app UI display screen 60 of FIG. 3*b*, which has been generated by the system of FIGS. 1-2 to retrieve additional information from a customer (e.g., the customer 16 of FIGS. 1-2) on behalf of a technician (e.g., the technician 12 of FIGS. 1-2).

FIG. 3*b* illustrates the example micro app UI display screen 60, which can be accessed via the link 58 provided in the incident report UI display screen of FIG. 3*a*. The micro app UI display screen 60 includes various UI controls 62-68 for facilitating obtaining additional information from the customer for forwarding to the technician to help the technician address the service request pertaining to the incident report submitted by the customer.

With reference to FIGS. 3*a* and 3*b*, the incident report UI 20 has been augmented with the link 58. Augmentation of the incident report UI 20 with the link 58 may be effectuated by the micro app delivery system 42 of FIGS. 1-2, e.g., in response to determination, by the back end server 34 and accompanying modules 36-40, that additional information is being requested from the customer by the technician, or is otherwise being automatically inferred (e.g., by the second AI module 38 of FIGS. 1-2) as being likely needed or useful to the technician; and further in response to generation of the micro app UI display screen 60 and accompanying functionality (represented by UI controls 62-68) used to collect the additional information from the customer.

In the present example embodiment, the incident report problem description 22 pertains to a non-working washing machine. Modules 36-40 of the backend server 34 of FIGS. 1-2 have generated and published (or otherwise made available to the customer) the micro app UI display screen 60 to collect a part number and a photo of the part from the customer.

Accordingly, the generated micro app UI display screen 60 includes a UI control or field 62, wherein the customer may enter the washing machine part number.

A second UI control, e.g., picture button 64, facilitates enabling the customer to use their mobile device (e.g., customer phone 18 of FIGS. 1-2) to take a photo of the washing machine in preparation for providing the photo to the incident database 26 of FIGS. 1-2, where it is then automatically accessible to the incident report app UI 28 of the technician phone 14 of FIGS. 1-2.

If the customer prefers to upload an existing photo, as opposed to taking a new photo, the customer may select a third UI control 66 to activate functionality for enabling the customer to browse their phone or other data source to select and upload a preexisting photo.

The customer may select a submit button 68 to commit the additional information, i.e., part number and photo, to the incident database 26 of FIGS. 1-2, where it may then be made available in the incident report app UI 28 of the technician phone 14 of FIGS. 1-2.

Figure 4:
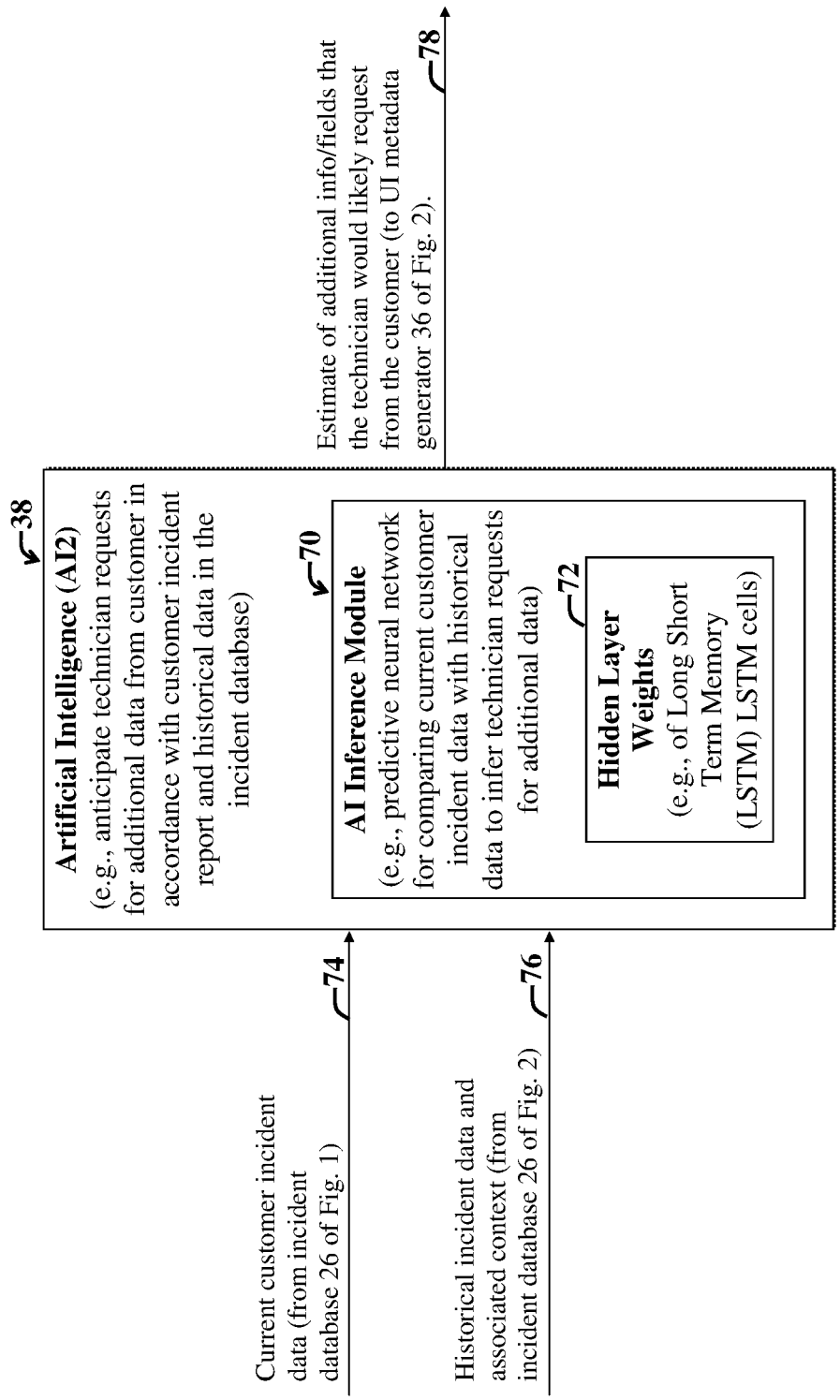
FIG. 4 illustrates additional example details of the second Artificial Intelligence (AI) module of the system of FIGS. 1-2, including example inputs used to generate an output prediction or estimate of additional information that will be needed or will otherwise be useful to a technician servicing a given incident report or service request.

FIG. 4 illustrates additional example details of the second AI module 38 of the system 10 of FIGS. 1-2, including example inputs 74, 76 used to generate an output prediction or estimate 78 of additional information that will be needed or will otherwise likely be useful to a technician servicing a given incident report or service request.

The example AI module 38 includes an AI inference module 70, which includes a predictive recurrent neural network with internal neurons (i.e., hidden layer cells) characterized by weights. The hidden layer cells may be Long Short Term Memory (LSTM) cells with selectively adjustable weights 72.

In operation, the AI inference module 70 implements a mapping or function, which takes the inputs 74, 76, and generates an inference 78 based on the inputs 74, 76. In the present example embodiment, the inputs 74, 76 include data 74 from a submitted customer incident report. The submitted incident report data 74 may include, for example, the problem description 22 of FIGS. 1-3*b*.

The inputs 74, 76 further include historical incident data and associated context 76, as available via the incident database 26 of FIGS. 1-2. For example, if the current customer incident data pertains to washing machine repair, the AI inference module 70 may retrieve (as input) not just other incident reports pertaining to washing machine repair, but stored information indicating what additional data technicians have previously requested from customers when servicing washing-machine repair requests pertaining to similar or related incident reports.

The AI inference module 70 then estimates what additional information may be needed by the technician (the additional information of which will be associated with fields of a predetermined format in the incident database 26, and wherein the predetermined format is determined by the UI metadata generator 36 of FIGS. 1-2). This estimate or inference represents a best-effort prediction by the AI inference module 70 of what additional information will be needed by a technician that is assigned to service the service request pertaining to the incident report from which the current customer incident data 74 is obtained.

Figure 5:
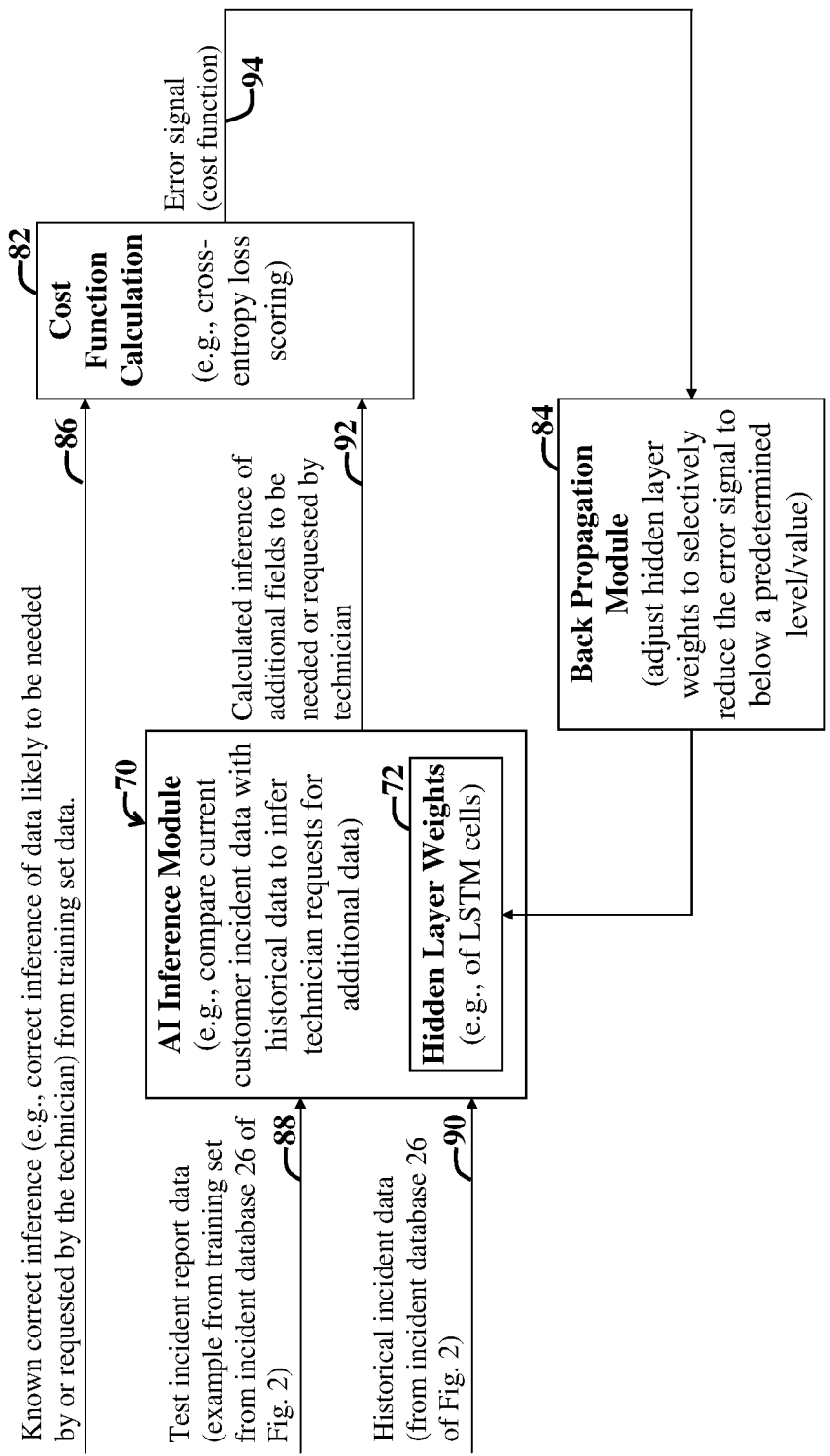
FIG. 5 illustrates additional example details of the second AI module of the system of FIGS. 1-2 during a training mode.

FIG. 5 illustrates additional example details of the second AI module 38 of the system 10 of FIGS. 1-2 during a training mode. During training of the AI inference module 70 (also shown in FIG. 4 as part of the second AI module 38), the AI inference module 70 and accompanying predictive neural network receive test data 88, 90 as input, and produce an output inference 92 based on the input test data 88, 90.

Note that the correct inference 86 for a given set of inputs 88, 90 from a test data set is already known and represents part of the test data set. The test data may be maintained in the incident report database 26 of FIGS. 1-2 and may represent a historical record of data pertaining to filed incident reports or service requests, including what additional information has been previously requested by technicians for the various incidents.

A cost function calculation module 82 analyzes and compares the calculated or estimated inference 92 output by the AI inference module 70 with the known correct inference 86, and generates an error signal 94, also called a cost function, reflecting a degree to which the calculated inference 92 diverges or differs from the known correct inference 86.

This error signal 94 is then input to a back propagation module 84. The back propagation module 84 includes or represents functionality (including computer code) for adjusting the hidden layer weights 72 of the predictive neural network implemented via the AI inference module 70. Note that the back propagation module 84 may implement one or more back propagation techniques, such as back propagation through time. Furthermore, note that while the back propagation module 84 is shown as a separate module (i.e., separate from the AI inference module 70), that in practice, functionality for facilitating back propagation of the error signal 94 may be integrated within the neural network of the AI inference module 70.

Back propagation performed by the back propagation module 84 includes selectively adjusting the hidden layer weights 72 of internal cells of the neural network of the AI inference module 70. The weights 72 are adjusted so as to reduce the error signal 94 to below a predetermined threshold, or to otherwise minimize the error signal 94 given the amount of training set data available. For example, in certain scenarios, amount of available training set data 86, 90 may be insufficient to drive the error signal 94 below the target threshold. In such cases, the hidden layer weights 72 are progressively or successively adjusted (which each new set of training inputs 86-90) to minimize the error signal 94.

Note that the training mode, which may use the modules 70, 72, 82, 84 of FIG. 5, may be implemented during supervised learning intervals. Alternatively, or in addition, the training mode occurs concurrently with active mode, i.e., while the accompanying AI inference module 70 is generating inferences based on inputs (e.g., the inputs 74, 76 of FIG. 4); not just previously stored specific training set inputs 88, 90.

Note that during operation of the AI inference module 70, if a technician handling an incident requests additional information from a customer, wherein the additional information was not inferred or anticipated by the AI inference module 70, then the technician-request for additional information may be stored in the incident database 26 of FIGS. 1-2 and may be subsequently used as part of the training set data 86-88 to facilitate improving inferences 92 output by the AI inference 70.

Figure 6:
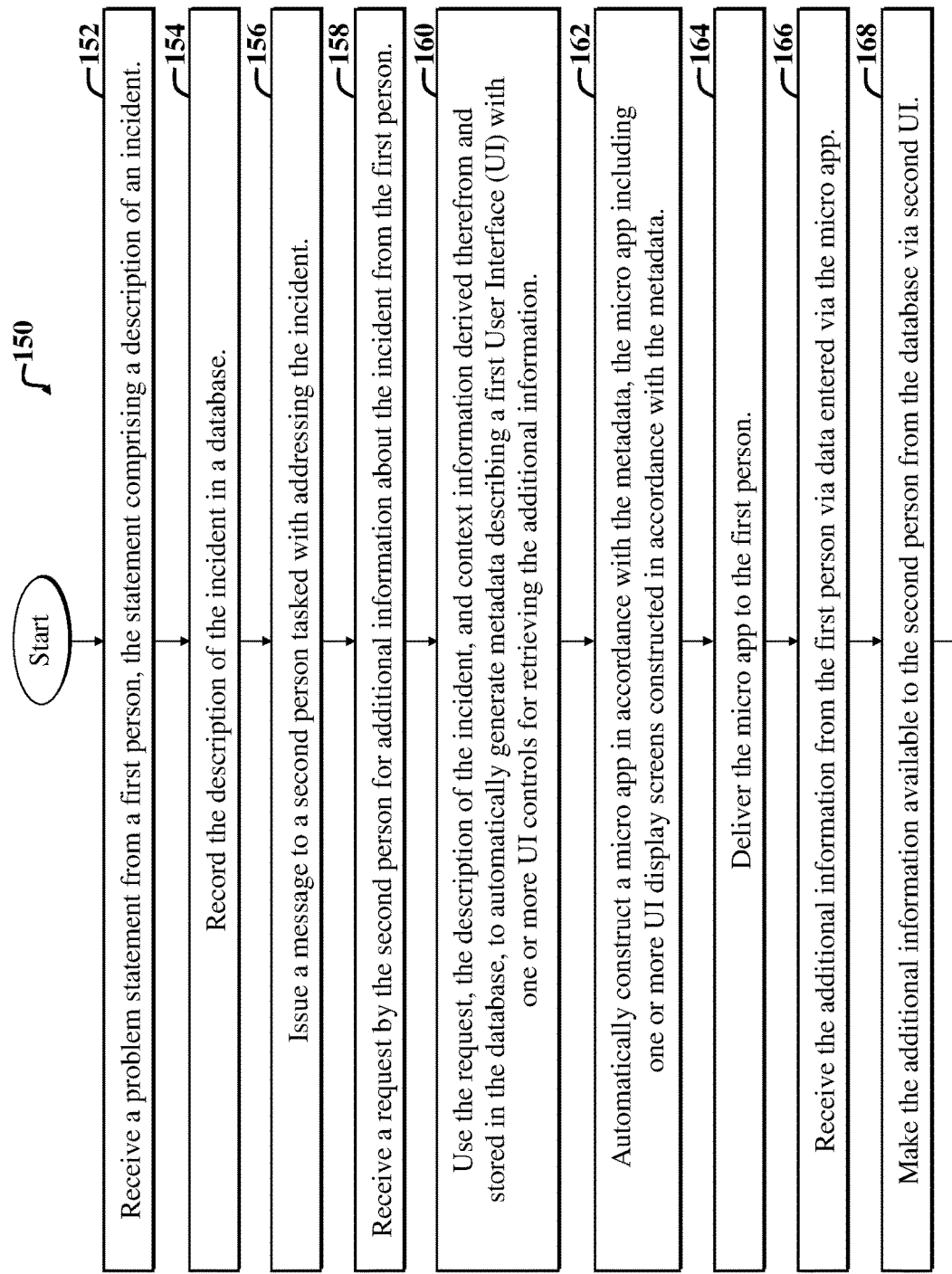
FIG. 6 is a flow diagram of a first example method implementable via the embodiments of FIGS. 1-5.

FIG. 6 is a first flow diagram of a first example method 150 implementable via the embodiments of FIGS. 1-5. The first example method 150 facilitates collection and delivery of data (e.g., information related to an incident report or associated service request), and includes a first step 152, which involves receiving a problem statement from a first person (e.g., the customer 16 of FIGS. 1-2) comprising a description of an incident.

A second step 154 includes recording the description of the incident in a database, such as the incident report database 26 of FIGS. 1-2. The initial description may be included in an incident report filed by a customer.

A third step 156 includes issuing a message to a second person (e.g., the technician 12 of FIGS. 1-2) tasked with addressing the incident.

A fourth step 158 includes receiving a request by the second person (e.g., technician) for additional information about the incident from the first person (e.g., customer).

A fifth step 160 includes using the request, the description of the incident, and context information derived therefrom and stored in the database (e.g., the database 26 of FIGS. 1-5), to automatically generate metadata describing a first User Interface (UI) with one or more UI controls for retrieving the additional information.

A sixth step 162 includes automatically constructing a micro app (e.g., via the UI metadata generator 36 and delivery system 42 of FIGS. 1-2) in accordance with the metadata, the micro app including one or more UI display screens (e.g., the UI display screen 60 of FIG. 3b) constructed in accordance with the metadata.

A seventh step 164 includes delivering the micro app to the first person (e.g., customer).

An eighth step 166 includes receiving the additional information from the first person (e.g., customer) via data entered via the micro app.

A ninth step 168 includes making the additional information (e.g., part number and photo, as suggested by the micro app UI display screen 60 of FIG. 3b) available to the second person (e.g., technician) from the database via second UI (e.g., the technician incident report app UI 28 of FIGS. 1-2).

Note that the first example method 150 may be modified, without departing from the scope of the present teachings. For example, the method 150 may further specify that the first person represents one or more customers of a proprietor of the system 10 of FIG. 1, and that the second person represents one or more technicians or support personnel tasked with assisting the customer in responding to and servicing the incident. The proprietor may be, for example, an enterprise that owns or operates the system 10 using a cloud.

The problem statement (e.g., the statement 22 of FIGS. 1 and 2, which is entered using a UI 20 of the customer phone 18) may include a description (e.g., the problem description 22 of FIGS. 1-3a) of a complaint filed by a customer.

The request for additional information (as may be made by a technician or automatically inferred by the second AI module 38 of FIGS. 1-2 and 4-5) further may include a natural language input (e.g., as entered via one or more UI controls 32 of the technician UI 28 of the technician phone 14) provided by a technician (e.g., the technician 12 of FIGS. 1 and 2). Note that while the request for additional information mentioned in the fourth step 158 is said to be by the technician, that the request may alternatively be made automatically on behalf of the technician, e.g., via the second AI module 38 of FIGS. 1-2 and 4-5.

The fifth step 160 of first example method 150 may further include employing the natural language input in combination with information characterizing a schema of the database (e.g., the database incident schema 50 of FIGS. 1 and 2), wherein the schema is associated with context information pertaining to the incident, to generate the metadata describing the first UI (e.g., corresponding to the micro app UI display screen 60 of FIG. 3b). Note that while the first UI may include or comprise one or more U controls and/or fields (e.g., UI controls 62-68 of FIG. 3b), whereby the customer can enter, upload, or otherwise provide information that has been requested by a technician, or information that has been automatically requested (by the second AI module 38 of FIGS. 1 and 2) on behalf of the technician.

The context information associated with the incident may include, for example, an incident identification number applied to the problem statement logged by the customer in the incident database (e.g., the incident database 26 of FIGS. 1 and 2).

Furthermore, the method 150 may be replaced with or augmented with additional methods. An example of such additional method includes facilitating automatically generating a software application to facilitate performing a task by: recording plural incidents (e.g., in the incident database 26 of FIGS. 1 and 2) filed by one or more first persons (e.g., one or more customer(s) 16 of FIGS. 1 and 2) seeking assistance in solving a problem (e.g., addressing or servicing an incident or associated complaint); detecting the filing of an incident by a first person of the one or more first persons (e.g., after a historical record of filed incidents has been connected and documented in the database 26 of FIGS. 1 and 2); using an AI algorithm (e.g., the predictive AI algorithms 38 of FIGS. 1 and 2) to process the incident, based on the plural incidents (e.g., historical incident record), to automatically determine additional information (e.g., part number, photo of the part, etc.) and one or more UI features (e.g., a field for specifying the part number) to facilitate retrieving the additional information from a second person (e.g., the technician 12 of FIGS. 1 and 2); generating a description (e.g., comprising UI metadata output from the UI metadata generator 36 of FIGS. 1 and 2) of a UI that includes the one or more UI features; determining a mechanism (e.g., text messaging 46, social media messaging 48, etc. of FIGS. 1 and 2) to provide the one or more UI features to the first person; receiving information (e.g., part number, photo of the part, etc.) from the first person, as entered via the one or more UI features; storing the information in a database (e.g., the incident database 26 of FIGS. 1 and 2), such that the information is accessible to one or more software applications of the second person.

The first person may represent one or more customers of a proprietor of a software system (e.g., the system 10 of FIGS. 1 and 2) implementing various methods discussed herein. The second person may represent one or more technicians tasked with assisting the first person based on the filing of the incident.

Note that the term "incident" may be interpreted broadly herein to include any situation or occurrence of one or more events or scenarios that are associated with a request, such as a customer request. Similarly, a request may include a description of the associated incident, which may also refer to or include a description of the request. Depending upon the context in which the term is used, the term "request" may also refer to a communication (e.g., a second request) by a second person that is responding to another request (e.g., a first request) made by a first person. Furthermore, note that while the terms "customer" and "technician" are used herein with reference to particular embodiments, embodiments are not limited to scenarios involving customers and technicians. For example, the customer may be any first person, and the technician may simply be a second person, without departing from the scope of the present teachings.

Figure 7:
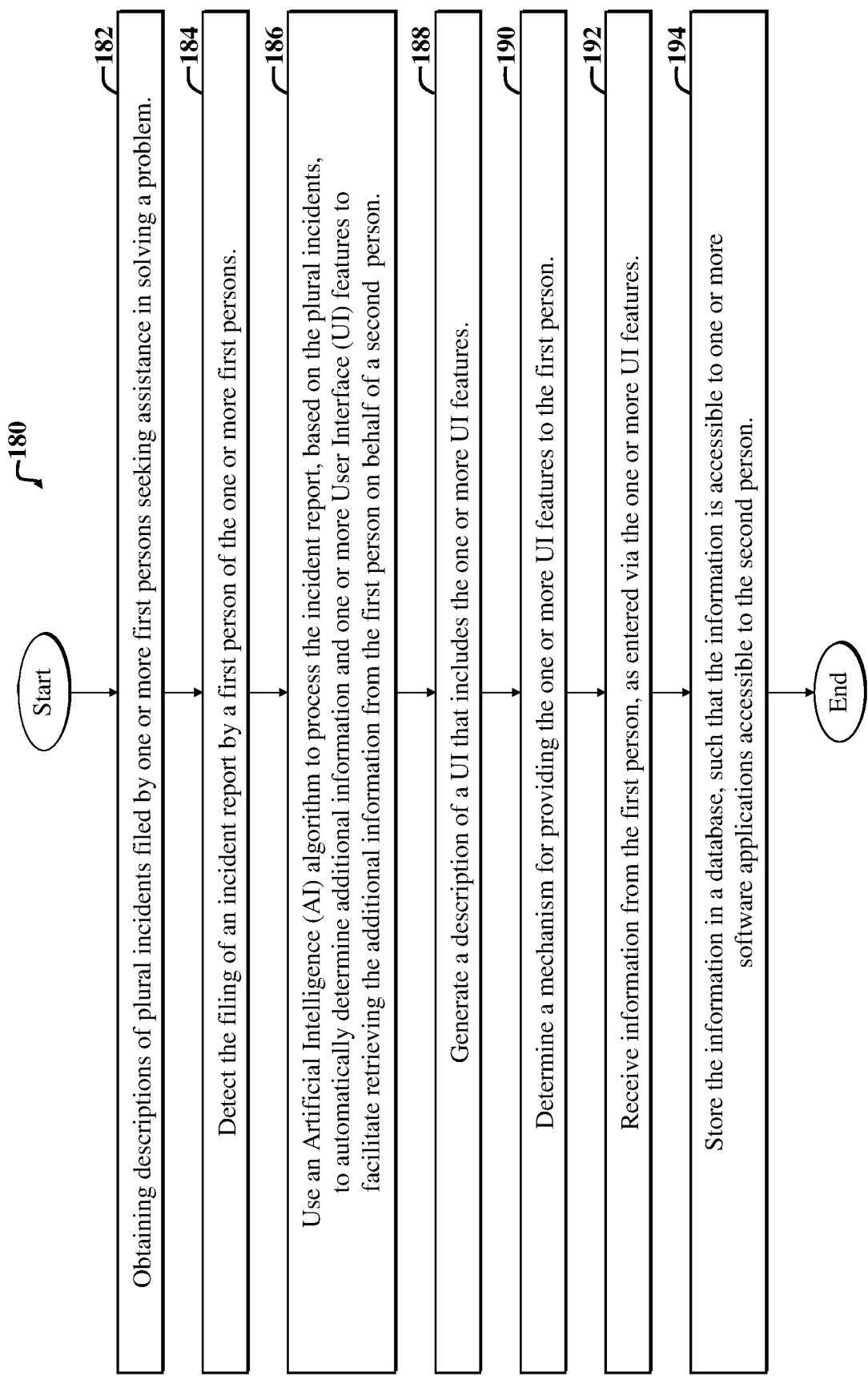
FIG. 7 is a flow diagram of a second example method implementable via the embodiments of FIGS. 1-5.

FIG. 7 is a flow diagram of a second example method 180 implementable via the embodiments of FIGS. 1-5. The second example method 180 facilitates generating a software application, e.g., mobile app and associated mobile app UI (e.g., corresponding to the mobile app UI display screen 60 of FIG. 3b), wherein the mobile app facilitates performing a task, such as collecting information from a customer for use by a technician in fulfilling a service request corresponding to an incident report.

An initial description-obtaining step 182 includes recording or otherwise obtaining descriptive information describing plural incidents or service requests filed by one or more first persons (e.g., customers) seeking assistance in solving a problem.

A subsequent filing-detection step 184 includes detecting the filing of an incident, i.e., incident report by a first person (e.g., customer) of the one or more first persons.

Next, an AI-using step includes using an AI algorithm (e.g., implemented via the second AI module 38 of FIGS. 1-2 and 4-5) to process the incident based on the plural incidents, so as to automatically determine additional information and one or more UI features (e.g., corresponding to the UI controls 62-68 of FIG. 5) to facilitate retrieving the additional information from the first person (e.g., customer) on behalf of a second person (e.g., technician).

Subsequently, a description-generating step 188 includes generating a description of a UI that includes the one or more UI features. The description may be generated, for instance, by the UI metadata generator 36 and micro app generator 44 of FIGS. 1-2.

Next, a delivery-determining step 190 includes determining a mechanism (e.g., text, email, incident report UI, link to a micro app UI hosted via a web page, etc.) for providing the one or more UI features to the first person (e.g., customer).

Subsequently, an information-receiving step 192 includes receiving information from the first person, as entered via the one or more UI features (e.g., corresponding to the UI controls 62-68 of FIG. 5).

Lastly, an information-storing step 194 includes storing the received or obtained information in a database (e.g., the incident database 26 of FIGS. 1-2), such that the information is accessible to one or more software applications (e.g., represented by the technician incident report app UI 28 of FIGS. 1-2) of the second person (e.g., technician).

Note that the second example method 180 may be modified, without departing from the scope of the present teachings. For example, the second example method 180 may further specify that the first person includes a customer of a proprietor of a software system used to implement the second example method 180, and wherein the second person includes a technician tasked with assisting the first person based on the filing of the incident, i.e., incident report and accompanying problem description or service request.

The second example method 180 may further specify that the system used to implement the method 180 includes mechanisms for adapting and predicting what the most requested information is given the initial set of input. When a customer files a new service request or incident report, the system can automatically generate the micro app and use it to request the predicted information. The resulting generated micro app is then sent to the customer. The technician can be informed (e.g., via a signal to the technician incident report app UI 28 of FIGS. 1-2, where the signal may be sent via one or modules of the backend server 34 or incident database 26) as to what additional information was automatically requested from the customer using the micro app.

By using the second AI module 38 of FIGS. 1-2 and 4-5 to automatically predict or infer what additional information the technician may need from the customer to service a particular problem described in an incident report, the technician saves time, as the technician no longer needs to figure out what additional information (from a customer) may be needed. The technician no longer needs to request that information from the customer, as the AI module 38 automatically infers what additional information the technician may need to service the service request represented by or included in the incident report.

Hence, the predictive neural network employed by the second AI module 38 of FIGS. 1-2 and 4-5 may learn parameters (e.g., requisite fields and UI controls) of previously generated micro apps, and then use the learned parameters to facilitate generation of subsequent micro apps as needed to meet the needs of a given service request or associated incident report.

Accordingly, over time, the second AI module 38 of FIGS. 1-1 and 4-5 can take over the technician's task of determining what additional information is needed from a customer to service a given problem specified in an incident report. The UI metadata generator 26 of FIGS. 1-2 then generates UI metadata used to construct the micro app UI that is used to collect the additional information from the customer.

Figure 8:
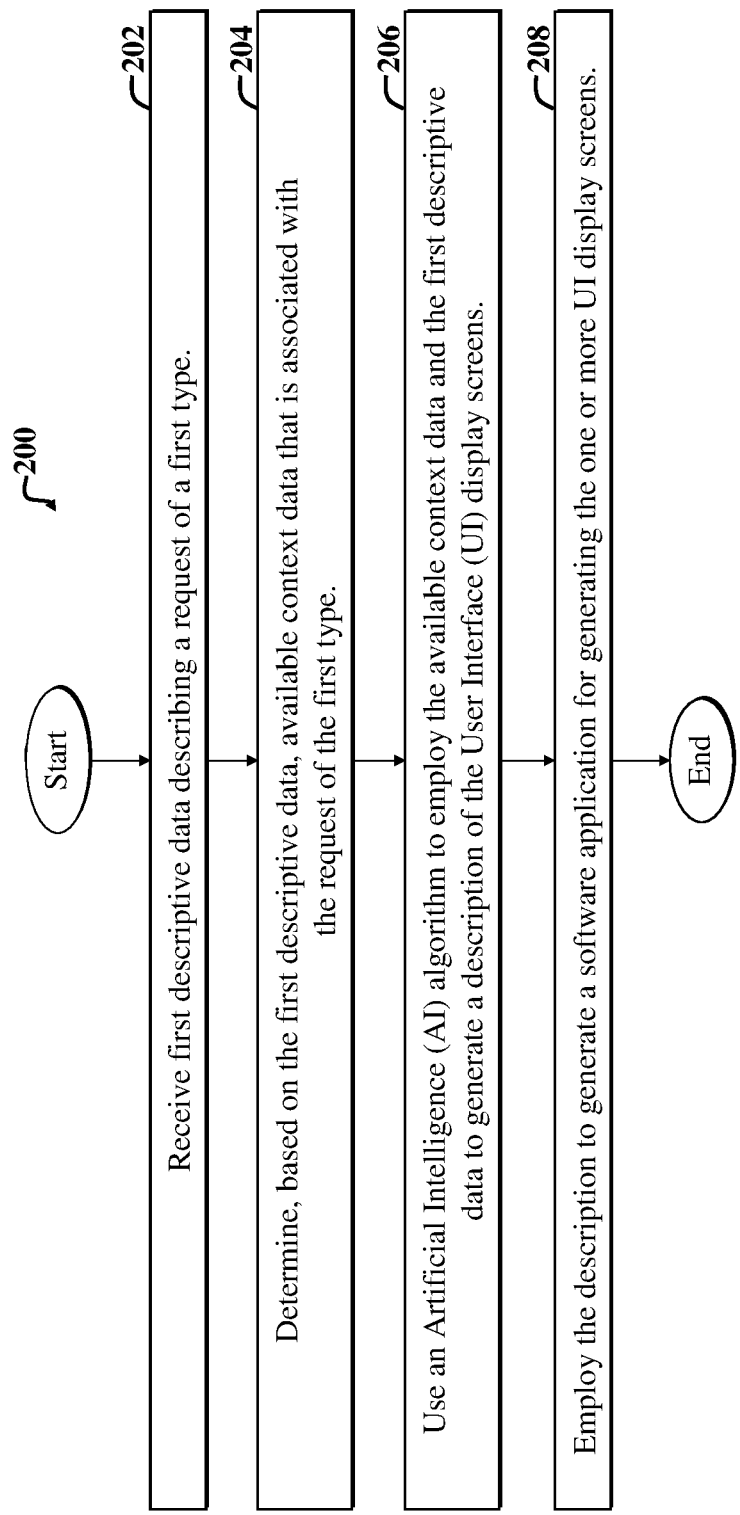
FIG. 8 is a flow diagram of a third example method implementable via the embodiments of FIGS. 1-5.

FIG. 8 is a flow diagram of a third example method 200 implementable via the embodiments of FIGS. 1-5. The third example method 200 includes an initial description-receiving step 202, which involves receiving first descriptive data (incident description from customer, but could also be voice request from technician) describing a request of a first type (service request).

Next, a context-determining step 204 includes determining or otherwise obtaining (e.g., from the incident database 26 of FIGS. 1-2) determining, based on the first descriptive data (e.g., pertaining to or included in an initial incident report), available context information (e.g., historical record of similar incidents of the same type and associated technician requests for additional data) that is associated with the request of the first type.

Subsequently, an AI-using step 206 includes using the available context information and the first descriptive data to generate a description (e.g., using the AI modules 38 and 36 of FIGS. 1-2) of one or more UI display screens (e.g., corresponding to the micro app UI display screen 60 of FIG. 3b).

Lastly, a description-using step 208 includes employing the description to generate a software application (e.g., micro app) for providing the one or more UI display screens.

Note that the method 200 may be modified, e.g., steps may be interchanged, omitted, or added, without departing from the scope of the present teachings. For example, the third example method 200 may further specify that the software application includes a micro app. The third example method 200 may further include additional steps, such as delivering the micro app to a user (e.g. made available to a customer via the incident UI 20 of FIGS. 1-3 and associated micro app UI display screen 60 of FIG. 3b); receiving user input provided by the user (e.g., customer) via the micro app; and incorporating the user input as part of the available context information for addressing one or more future received requests.

The third example method 200 may further specify that the available context information includes a description of data (e.g., as may be provided via technician voice input and/or the output of the second AI module 38 of FIGS. 1-2) to be received to facilitate fulfilling the request of the first type.

The third example method 200 may further include using a first instance of an AI algorithm (e.g., corresponding to the second AI module 38 of FIGS. 1-2) to estimate what additional context information should be requested from a user (e.g., customer) by another user (e.g., technician) through selectively prompting the customer (e.g., via the one or more UI controls 62-68 of the micro app UI 60 of FIG. 3b) for the additional context information to augment the preexisting context information.

The first descriptive data may include a natural language description (e.g., as may be included as the problem description 22 of FIGS. 1-2 and 4 of an incident report) comprising the request of the first type. The third example method 200 may further include using another AI algorithm or module (e.g., corresponding to the UI metadata generator 36 of FIG. 1-2) to generate the description of the one or more UI display screens.

The third example method 200 may further include using a first instance of an AI algorithm (e.g., corresponding to the second AI module 38 of FIGS. 1-2) to learn one or more associations between the request of the first type (e.g., incident report) and context information (e.g., historical incident data from the incident database 26 of FIGS. 1-2) that is to be subsequently treated as the available context information for the purposes of generating the one or more UI display screens. The learning step may further include inputting the additional context into the first instance of an AI algorithm to thereby facilitate learning by the first instance, the one or more associations.

The third example method 200 may further include determining an intended recipient (e.g., technician) of the request of the first type (e.g., service request corresponding to an incident report), wherein the intended recipient is tasked with responding to the request of the first type; and delivering the software application to an issuer (e.g., customer) of the request of the first type, and wherein the software application (e.g., micro app represented by the micro app UI display screen 6-0 of FIG. 3b) is configured to collect information from the issuer for electronic delivery to the intended recipient (e.g., technician).

The third example method 200 may further specify that the description of the one or more UI display screens includes metadata characterizing a UI model to be employed by the software application (e.g., micro app).

The third example method 200 may further specify that the request of a first type includes a repair request, and may further include automatically generating the software application, such that the software application conforms to available context information associated with the first type.

The third example method 200 may further specify using an AI module (e.g., corresponding to the second AI module 38 of FIGS. 1-2) to process the context information, and another AI module (e.g., the UI metadata generator 36 of FIGS. 1-2) to generate an inference describing a UI display screen to be constructed based on the metadata. The available context information may include additional context information describing one or more software applications (e.g., micro apps) previously built by a system (e.g., the system 10 of FIGS. 1-2) used to implement the third example method 200.

The third example method 200 may further include automatically requesting data to facilitate fulfilling the request of the first type, wherein the request of a first type is issued by a first user (e.g., customer) to a second user (e.g., technician), and wherein automatically requesting data is performed on behalf of the second user (e.g., technician) to obtain information from the first user (e.g., customer) as needed to fulfill the request of the first type.

Figure 9:
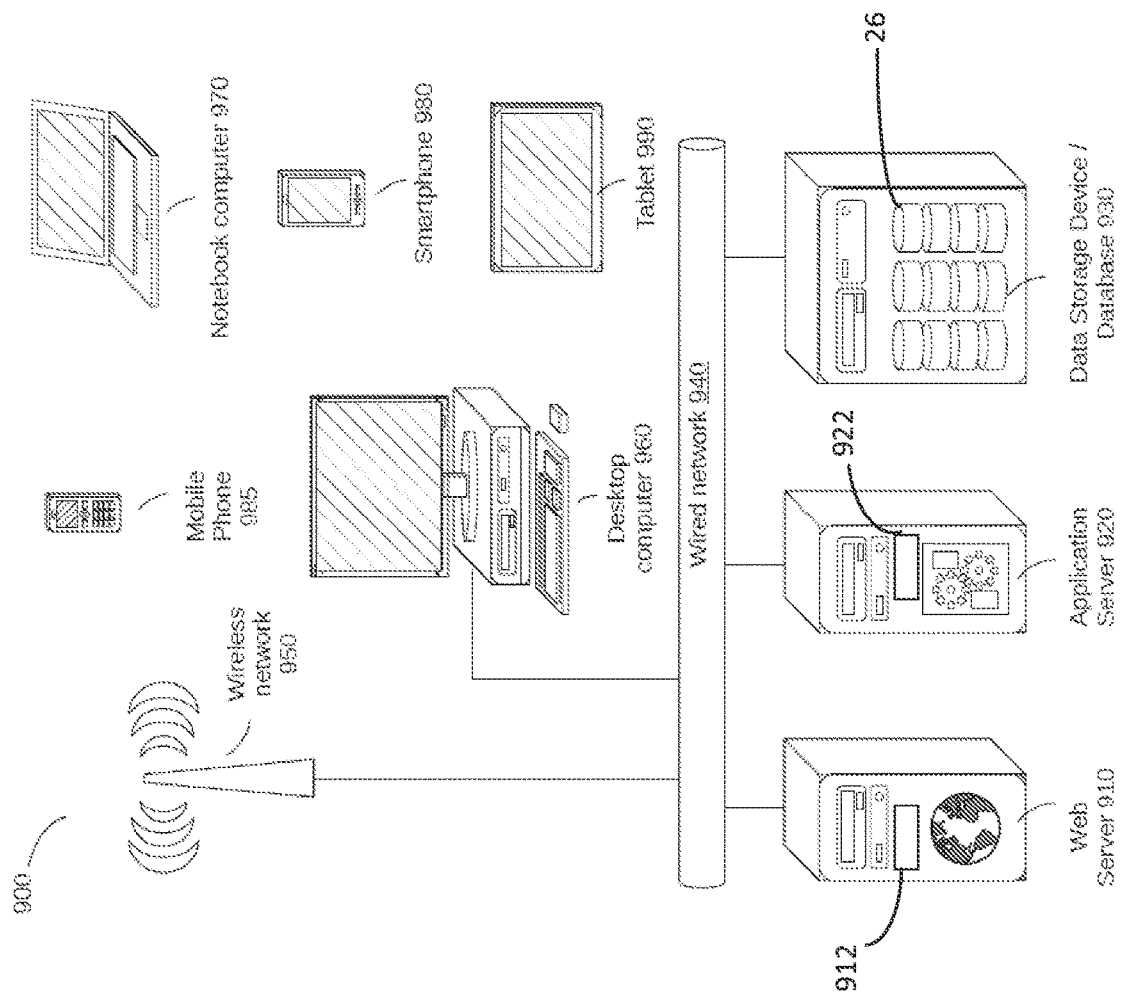
FIG. 9 is a general block diagram of a system and accompanying computing environment usable to implement the embodiments of FIGS. 1-7.

FIG. 9 is a general block diagram of a system 900 and accompanying computing environment usable to implement various embodiments discussed herein. For example, the example system 900 is usable to implement the system 10 of FIGS. 1-2 and accompanying methods 150, 180, 200 of FIGS. 6-8. Embodiments may be implemented using standalone applications (e.g., residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, the web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system of FIG. 9 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1-2 and 9, the mobile devices 14, 18 may be implemented via one or more of the user computers 960-990 of FIG. 9. The backend server 34 of FIGS. 1-2 may be implemented via the web server 910 and/or application server 920 of FIG. 9. For example, in certain implementations, the customer incident UI 20 and technician incident report app UI 28 of FIGS. 1-2 are implemented using web applications, which may be accessible to the mobile devices (e.g., smartphones) 14, 18 via incident web pages 912 hosted by the web server 910. The backend server 34 may be implemented via application server 920, which may communicate with the incident UI software application 922 providing the UIs 20, 28 of FIGS. 1-2. The incident database 26 of FIGS. 1-2 may be implemented via the data storage device 930 of FIG. 9.

Figure 10:
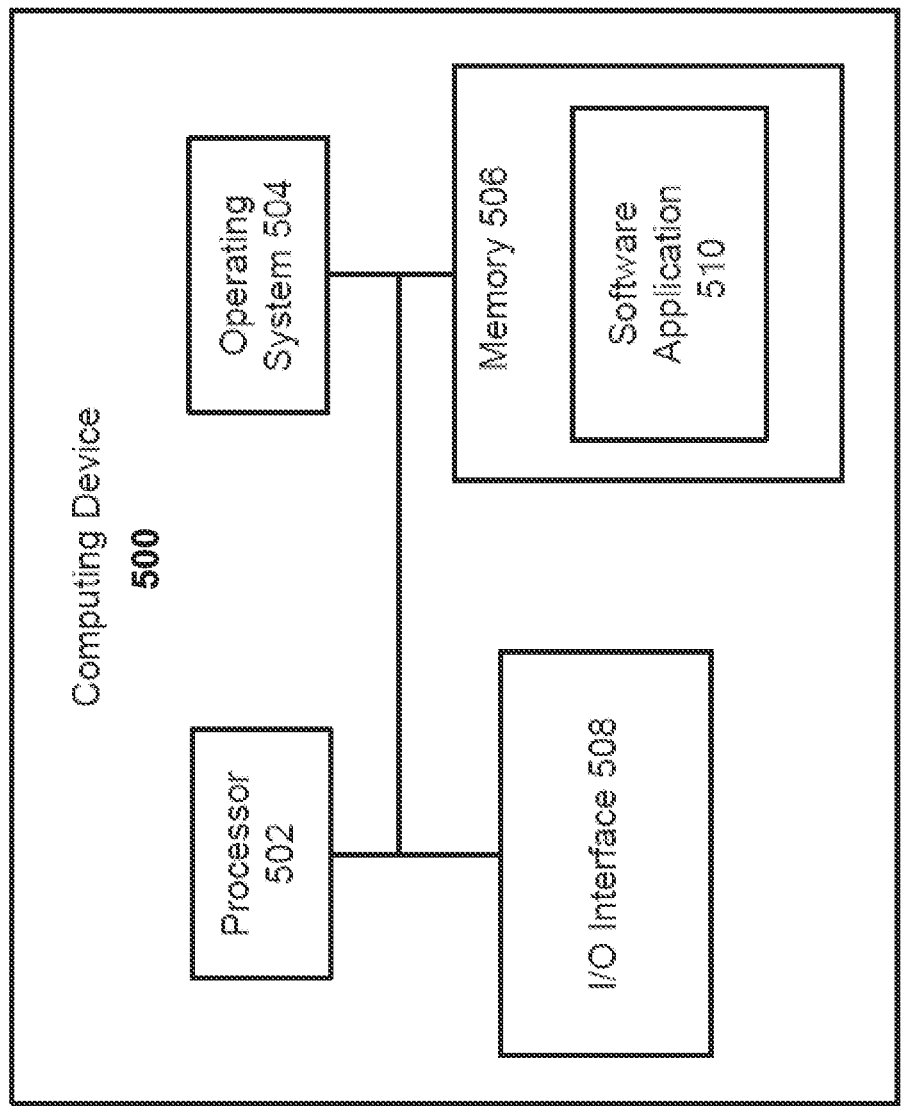
FIG. 10 is a general block diagram of a computing device usable to implement the embodiments of FIGS. 1-8.

FIG. 10 is a general block diagram of a computing device usable to implement the embodiments of FIGS. 1-3. While system 500 of FIG. 10 is described as facilitating performing the steps as described in certain implementations herein, any suitable component or combination of components of system 500 or any suitable processor or processors associated with system 500 may be used for performing the steps described.

FIG. 10 illustrates a block diagram of an example computing system 500, which may be used for implementations described herein. For example, computing system 500 may be used to implement server devices 910, 920 of FIG. 9 as well as to perform the method implementations described herein, e.g., to run the systems 12-16 of FIG. 1.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 10 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments are discussed with reference to an example use case scenario involving a field technician needing to request additional data from a customer (who has filed a complaint, incident report, and or service request), and subsequent automatic generation of a micro app delivered to the customer to obtain the requisite additional information, embodiments are not limited thereto.

As another example, while various embodiments anticipate using LSTM cells to implement a predictive neural network, embodiments are not limited thereto. For example, those skilled in the art may employ different Gated Recurrent Units (GRUs) or Neural Turing Machines (NTMs) with external memory accessible to an accompanying recurrent neural net to implement alternative embodiments.

Various other scenarios, including enterprise-related scenarios may benefit from use of embodiments discussed herein without departing from the scope of the present teachings. For example, a loan agent needing to obtain additional information from a lendee before the lender can issue the loan may benefit from mechanisms discussed herein enabling automatic generation of a micro app to request the requisite information from the lendee.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory machine-readable medium including instructions executable by one or more processors, and when executed operable for:
   receiving a request of a first user;
   applying a first artificial intelligence (AI) algorithm to determine one or more predictions of additional information to be provided by a first device of the first user, wherein applying the first AI algorithm comprises:
   drawing one or more associations between the request and context information, and
   outputting the one or more predictions;
   generating, based at least in part on the one or more predictions, metadata describing a User Interface (UI) for retrieving the additional information;
   constructing a micro application including one or more UI display screens constructed in accordance with the metadata;
   providing the micro application to the first device; and
   receiving the additional information from the first device via data entered using the micro application.

2. The machine-readable medium of claim 1, wherein the one or more predictions include natural language that would likely be provided as a request for the additional information by a second user tasked with addressing the request.

3. The machine-readable medium of claim 2, wherein the generating of the metadata is performed by a second artificial intelligence (AI) algorithm that receives as input the natural language and outputs the metadata.

4. The machine-readable medium of claim 3, wherein the natural language is converted into one or more software commands to ask for the additional information.

5. The machine-readable medium of claim 1, wherein constructing of the micro application further comprises converting the metadata into an application format.

6. The machine-readable medium of claim 1, wherein the request includes a problem description including a description of an incident.

7. The machine-readable medium of claim 1, wherein the context information includes one or more of: related incidents, identification of a second user tasked with addressing the request, or current state of the first user.

8. A method for automatically generating a software application for facilitating collection of data, the method comprising:
   receiving a request of a first user;
   applying a first artificial intelligence (AI) algorithm to determine one or more predictions of additional information to be provided by a first device of the first user, comprising:
   drawing one or more associations between the request and context information, and
   outputting the one or more predictions;
   generating, based at least in part on the one or more predictions, metadata describing a User Interface (UI) for retrieving the additional information;
   constructing a micro application including one or more UI display screens constructed in accordance with the metadata;
   providing the micro application to the first device; and
   receiving the additional information from the first device via data entered using the micro application.

9. The method of claim 8, wherein the one or more predictions include natural language that would likely be provided as a request for the additional information by a second user tasked with addressing the request.

10. The method of claim 9, wherein the generating of the metadata is performed by a second artificial intelligence (AI) algorithm that receives as input the natural language and outputs the metadata.

11. The method of claim 10, wherein the natural language is converted into one or more software commands to ask for the additional information.

12. The method of claim 8, wherein constructing of the micro application further comprises converting the metadata into an application format.

13. The method of claim 8, wherein the request includes a problem description including a description of an incident.

14. The method of claim 8, wherein the context information includes one or more of: related incidents, identification of a second user tasked with addressing the request, or current state of the first user.

15. An apparatus comprising:
   one or more processors;
   logic encoded in one or more non-transitory media for execution by the one or more processors and when executed operable for:
   receiving a request of a first user;
   applying a first artificial intelligence (AI) algorithm to determine one or more predictions of additional information to be provided by a first device of the first user, comprising:
   drawing one or more associations between the request and context information, and
   outputting the one or more predictions;

generating, based at least in part on the one or more predictions, metadata describing a User Interface (UI) for retrieving the additional information;

constructing a micro application including one or more UI display screens constructed in accordance with the metadata;

providing the micro application to the first device; and receiving the additional information from the first device via data entered using the micro application.

16. The apparatus of claim 15, wherein the one or more predictions include natural language that would likely be as a request for the additional information provided by a second user tasked with addressing the request.

17. The apparatus of claim 16, wherein the generating of the metadata is performed by a second artificial intelligence (AI) algorithm that receives as input the natural language and outputs the metadata.

18. The apparatus of claim 17, wherein the natural language is converted into one or more software commands to ask for the additional information.

19. The apparatus of claim 15, wherein constructing of the micro application further comprises converting the metadata into an application format.

20. The apparatus of claim 15, wherein the context information includes one or more of: related incidents, identification of a second user tasked with addressing the request, or current state of the first user.

* * * * *

UNITED STATES PATENT AND TRADEMARK OFFICE
CERTIFICATE OF CORRECTION

PATENT NO. : 11,733,978 B2
APPLICATION NO. : 17/555103
DATED : August 22, 2023
INVENTOR(S) : Straub et al.

Page 1 of 1

It is certified that error appears in the above-identified patent and that said Letters Patent is hereby corrected as shown below:

In the Drawings

On sheet 1 of 10, in FIG. 1, Line 15, delete "mico" and insert -- micro --, therefor.

On sheet 2 of 10, in FIG. 2, Line 15, delete "mico" and insert -- micro --, therefor.

In the Specification

In Column 2, Line 62, delete "(and or" and insert -- (and/or --, therefor.

In Column 8, Line 26, after "12" insert -- . --, therefor.

In Column 19, Line 15, delete "FIG." and insert -- FIGS. --, therefor.

In Column 22, Line 14, delete "and or" and insert -- and/or --, therefor.

Signed and Sealed this
Fourth Day of June, 2024

Katherine Kelly Vidal
*Director of the United States Patent and Trademark Office*